Figure 1:
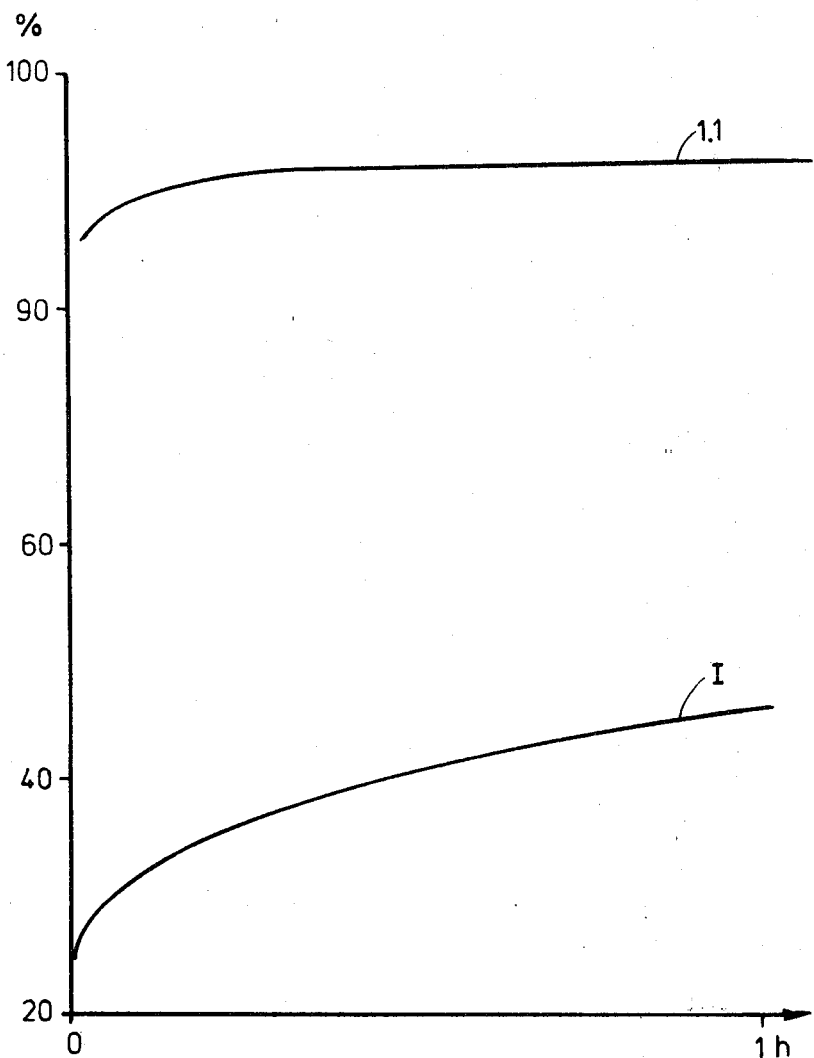

United States Patent [19]

Buxbaum et al.

[11] 4,369,265
[45] Jan. 18, 1983

[54] READILY DISPERSIBLE SILICONE-COATED FINELY DIVIDED SOLIDS

[75] Inventors: Gunter Buxbaum, Krefeld-Traar; Ottfried Schlak, Leverkusen; Franz Hund; Lutz Leitner, both of Krefeld-Bockum, all of Fed. Rep. of Germany

[73] Assignee: Bayer Aktiengesellschaft, Leverkusen, Fed. Rep. of Germany

[21] Appl. No.: 160,782

[22] Filed: Jun. 18, 1980
(Under 37 CFR 1.47)

[30] Foreign Application Priority Data

Jul. 6, 1979 [DE] Fed. Rep. of Germany ....... 2927379

[51] Int. Cl.³ .................................................. C09C 3/12
[52] U.S. Cl. ............................... 523/212; 106/308 M; 428/403; 428/405; 523/206
[58] Field of Search ................... 106/308 M; 428/403, 428/405; 260/375 B; 523/206, 212

[56] References Cited

U.S. PATENT DOCUMENTS

| | | | |
|---|---|---|---|
| 3,944,705 | 3/1976 | Fujioka et al. | 428/405 |
| 3,979,546 | 9/1976 | Lewis | 428/405 |
| 4,072,796 | 2/1978 | Reinhardt et al. | 428/405 |
| 4,151,154 | 4/1979 | Berger | 428/405 |
| 4,191,587 | 3/1980 | Kratel et al. | 428/405 |

*Primary Examiner*—Allan Lieberman
*Attorney, Agent, or Firm*—Sprung, Horn, Kramer & Woods

[57] ABSTRACT

Readily dispersible finely divided solids such as pigments, coated with an organo-silicone polymer of the formula

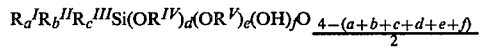

$$R_a^I R_b^{II} R_c^{III} Si(OR^{IV})_d (OR^V)_e (OH)_f O_{\frac{4-(a+b+c+d+e+f)}{2}}$$

wherein
  $R^I$, $R^{II}$, $R^{III}$ each independently is an optionally halogenated alkyl, alkenyl or aryl radical having from 1 to 10 carbon atoms;
  $R^{IV}$ is an alkyl or alkenyl radical having from 9 to 24 carbon atom;
  $R^V$ is an alkyl or alkenyl radical having from 1 to 8 carbon atoms;
the sum of $a+b+c$ is from 1 to about 1.95;
d is a number from about 0.2 to 2;
e and f each independently is a number from 0 to 1;
the sum of $d+e+f$ is from about 0.2 to 2; and
the sum of $a+b+c+d+e+f$ is up to 3.

8 Claims, 1 Drawing Figure

READILY DISPERSIBLE SILICONE-COATED FINELY DIVIDED SOLIDS

This invention relates to the preparation and use of finely divided solids covered in polymeric organosilicon compounds.

Finely divided solids are used in particular as color pigments and magnetic pigments, for which purposes they are incorporated into a polymer matrix. The properties thereof are to a large extent influenced by the dispersibility thereof and the ability thereof to be wetted by the binders and make up the necessary volume in the binders. The system of binders and solids may be subjected to certain stresses, such as reactions of the solid particles with the binder, temperature differences, the affect of radiation and mechanical stresses. These stresses may be reduced or even eliminated by controlled surface treatment of the finely divided solids and, moreover, such treatment may also facilitate the incorporation of the finely divided solid particles into the binder systems and increase the life of the whole system. In the case of color pigments, the intensity of color also depends on the dispersibility.

Very high qualitative demands of this type must be met by magnetic pigments. Magnetic iron oxides used for the storage of signals are normally prepared from needle-shaped precursor compounds by a process of reduction at temperatures of from about 300° to 500° C. This thermal treatment produces a substantial alteration in the pigment surface and effects sintering. This seriously impairs the ability of the pigments to be wetted by binders, including both those binders which may be diluted with water and those which are incompatible with water.

Good dispersion properties and high volume filling are, however, two essential requirements for obtaining good electroacoustic properties in modern cassette tapes with high volume control.

It has been proposed to render magnetic iron oxides hydrophobic. This may be achieved by means of, for example, alkyl trichlorosilanes (German Offenlegungsschrift No. 1,767,973) or silicon compounds of the type: $R_nSi(OR')_{4-n}$ wherein R represents a $C_1$–$C_{18}$ alkyl group; R' represents a short chain alkyl group; and n represents 1 to 3 (German Offenlegungsschrift No. 2,543,962). While in the first-mentioned process, the treatment from aqueous solution is insufficient, the second process requires the use of considerable quantities of the organosilicon compound, i.e. from 0.5 to 40%, by weight, preferably from 2.5 to 40%, by weight, based on the pigment.

Quantities of more than from about 1 to 2% of silicone resin or oil generally have an adverse effect on the binder and hence, for example, on the dispersion, abrasion and sliding properties and the stability of the lacquer. If therefore, pigments are to be suitable for use in various types of binders including, for example, lacquer systems which are water-soluble or which may be diluted with water, it is necessary to avoid using more than 2% concentrations of silicone resins or oils. Pigments which have been rendered hydrophobic are unsuitable for the last-mentioned application.

It has now surprisingly been found that the properties of finely divided solid particles may be improved by covering the particles with polymeric organic silicon compounds of the type:

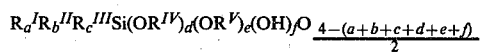

wherein
$R^I, R^{II}, R^{III}$ represents optionally branched cyclic, unsaturated and/or halogenated monovalent aliphatic or aromatic hydrocarbon groups having from 1 to 10 carbon atoms;
$R^{IV}$ represents an optionally branched, monovalent aliphatic hydrocarbon group having from 9 to 24 carbon atoms; and
$R^V$ represents an optionally branched, monovalent aliphatic hydrocarbon group having from 1 to 8 carbon atoms.

The sum of $a+b+c$ is from 1.0 to about 1.95; d represents a number of from about 0.2 to 2; e and f each represents a number of from 0 to 1.

The sum of $d+e+f$ is from about 0.2 to 2.0. The sum of $a+b+c+d+e+f$ must be less than or equal to 3.

Compounds wherein $R^I$ represents methyl; $R^{II}$ represents phenyl; the sum of $a+b$ is from 1.0 to about 1.75; $C=O$; $R^{IV}$ represents a monovalent aliphatic group having from 9 to 24 carbon atoms; d represents a number from about 0.5 to 1.5; $R^V$ represents a monovalent aliphatic group having 1 or 2 carbon atoms; e represents a number of from 0 to about 0.8; and f represents 0; are preferred.

In another preferred material a is about from 1.0 to 1.95; b and c are zero; d is from about 0.2 to 0.9; e is from about 0.1 to 0.8; and f is zero.

The adverse effect of the organosilicon component on the stability of the lacquer is suppressed by the high proportion, by weight, of hydrocarbon groups so that no adverse effects are observed even when the concentration of organosilicon compounds is about 2%, by weight, based on the finely divided solid substance.

Solids which are particularly suitable for being provided with this covering are those which have a specific surface area of at least about 1 m² per gram, preferably at least about 5 m² per gram. Finely divided solids which have been exposed to an annealing process in the course of the preparation thereof are generally hydrophobic and therefore cannot be worked-up in an aqueous or predominantly aqueous medium. After a treatment with the above-mentioned organosilicon compounds, these finely divided solids may be used both in aqueous media and in apolar media.

According to a preferred embodiment of the present invention, a needle-shaped magnetic oxide of the type suitable for compact cassettes with high volume control is mixed with water to a slurry in a concentration of about 50 to 500 g/l, preferably using water at a temperature of about 60° to 95° C., and the slurry is treated, by vigorous stirring, with a solution of an organosilicon compound corresponding to the formula:

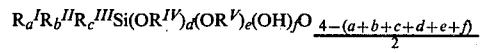

The solvents used are preferably water-miscible, e.g. dioxane, butanone-2 or acetone.

One example of an organosilicon compound of the general type mentined above corresponds to the formula:

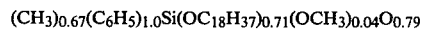

This compound may be prepared by reacting a silicone resin which contains the appropriate proportions of $(CH_3)_2SiO$, $(C_6H_5)_2SiO$ and $C_6H_5SiO_{3/2}$ with a certain quantity of stearyl alcohol and catalytic quantities of tetrabutyl titanate.

The reaction of the silicone constituent with a higher alcohol to produce the silicone resin is essential in determining the quality of the products.

It is important for this purpose that the higher alcohol should have a chain length of at least 9 carbon atoms. Higher alcohols having from 9 to 24 carbon atoms were found to be suitable and stearyl alcohol was found to be particularly suitable.

It is also important that the higher alcohol should be attached to the silicone constituent through a SiOC linkage. When components which were not chemically linked were used, they were not found to produce satisfactory results, either when used alone or when used as mixtures. The presence of a certain proportion of SiOR groups with small RO groups, such as methoxy and ethoxy, is advantageous.

After the treatment, the pigment is filtered, dried at about 40° to 150° C., preferably about 60° to 80° C., and condensed in the conventional type of densifying apparatus, such as a ball mill or roller densifier.

The pigment obtained is easily wetted both by organic solvents and by water.

One particular field of application lies in the covering of magnetic pigments, which results in a substantial improvement in the dispersibility and packing characteristics of the magnetic pigments in lacquer without rendering them hydrophobic.

In the accompanying drawing the FIGURE is a plot of dispersing time against color development.

It has also been found that pigments which have been aftertreated according to the present invention may be condensed much more easily and to higher packing densities in the conventional pin mills or roller densifier, so that milder and less damaging conditions may be employed. This is particularly advantageous for magnetic iron oxides which have been doped with cobalt since it requires less cobalt for adjusting the pigments to a high coercive force.

To determine the properties of the magnetic oxides, a magnetic tape is produced by the conventional method based on British Pat. No. 1,080,614: A magnetic lacquer is first prepared by milling, for 3½ hours in a pebble mill, 22.4 parts, by weight, of the magnetic pigment with 8 parts, by weight, of PVC/PVA copolymer, 1.3 parts, by weight, of oleic acid, 0.88 parts, by weight, of complex organic phosphoric acid esters and 67 parts, by weight, of butyl acetate/ethyl acetate (1:1). This lacquer is then cast on a polyester foil which has a thickness of about 23 μm. It is then oriented in a magnetic field, dried and calendered under pressure between rollers at an elevated temperature. The magnetic layer has a thickness of about 12 μm and contains about 15 g/m² of magnetic pigment.

The static magnetic measurements are carried out in a measuring field of about 4000.0e.

The dynamic measurements, high volume control at 10 KHz ($A_{10}$) and maximum volume control at 333 Hz ($A_v$), are carried out in accordance with the known DIN regulations (DIN 45 513), part 6, (1976) and DIN 45 512 sheet 2.

The volume filling factor (VF) is a measure of the volumetric proportion of magnetic pigment in the dried, but not yet rolled lacquer.

The silicone resins used according to the present invention are obtained by the method of preparation described below. In this description, the parts and percentages given are parts, by weight, and percentages, by weight, unless otherwise indicated.

Preparation of a silicone resin A:

65.04 parts of stearyl alcohol and 0.001 part of tetrabutyl titanate as catalyst are added to 51.18 parts of a silicone resin of 33.3 mol % of $(CH_3)_2SiO$, 33.3 mol % of $(C_6H_5)_2SiO$ and 33.3 mol % of $C_6H_5SiO_{3/2}$ having a methoxy content of 15.4%, by weight. The mixture is then heated to 160° C. for 2 hours with vigorous stirring and then baked at 160° C. under a pressure of 100 mbar for one hour. A total of 7.7 parts of methanol, (the equimolar quantity corresponding to the stearyl alcohol put into the process) is removed in the process. The product becomes solid when cooled to room temperature. The softening temperature is about 50° C. The proportion of stearyloxy units present is 59.71%, by weight. The average formula is as follows:

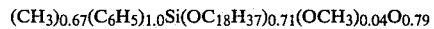

Preparation of a silicone resin B:

62.26 parts of stearyl alcohol and 0.001 part of tetrabutyl titanate as catalyst are added to 48.34 parts of a silicone resin having an ethoxy content of 41.15%, by weight and corresponding to the following averge formula:

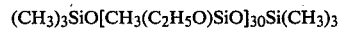

The mixture is then heated to 180° C. for 2 hours with vigorous stirring and finally baked at 150° C. and 50 mbar for one hour. A total of 10.60 parts of ethanol (the equimolar quantity corresponding to the stearyl alcohol put into the process) is removed. The product becomes solid on cooling to room temperature. The softening temperature is about 40° C. The proportion of stearyloxy units is 62.03%. The average formula is as follows:

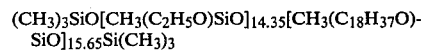

or

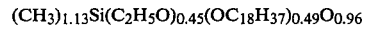

After-treatments are exemplified below, although other methods commonly used in the art for applying substances to pigment surfaces, for example in a turbulent flow or in a continuous stirrer vessel may, of course, also be used. The present invention is, of course, not limited to the exemplified magnetic oxide, but may advantageously be applied to various magnetic pigments prepared by a conversion process at elevated temperatures, such as $Fe_3O_4$, $Fe_3O_4$-$\gamma$-$Fe_2O_3$ mixed phases, $\gamma$-$Fe_2O_3$ or pigments of a similar type containing foreign ions, such as cobalt doped pigments.

The after-treatment according to the present invention may advantageously also be used on pyrophoric iron or alloy pigments. When these pigments are subjected to this after-treatment they are also phlegmatized. Ferrite pigments, such as $BaFe_6O_{19}$, may also advantageously be treated by this method. The improvement in dispersibility achieved by the treatment with the novel silicones resins is observed not only in magnetic iron oxide pigments, but in all pigments which are subjected to an annealing process in the course of the preparation thereof. As examples may be mentioned the oxide pigments, such as pigments of iron oxide, titanium dioxide, nickel titanium yellow, chrome oxide, cobalt blue and sulphidic, selenidic, and silicate pigments, as well as other pigments known in the art and listed in the Handbook of Pigments. Comparison Examples I, II, III:

A highly orientatable $\gamma$-$Fe_2O_4$ doped with 0.35%, by weight, of zinc and 0.3%, by weight, of $P_2O_5$ during preparation of the starting material, obtainable by the process according to U.S. Pat. No. 3,931,025 and having a coercive force when in the powder form of 338 Oe and the properties shown in the Table (Comparison Example I) when applied to a magnetic tape is compacted to a top density according to DIN 53 194 of 0.94 g/cm³. The properties are given under Comparison Example II. The powder described in Example 1 is made up into a slurry with water heated to 80° C. (50 g/l), stirred for ½ hour, filtered and dried. It is then condensed under the same conditions as in Example 2. A tap density of 0.86 g/cm³ is obtained. The properties of this powder are shown in Comparison Example III.

EXAMPLE 1.1

500 g of the magnetic oxide from Comparison Example A are made up into a slurry with 10 l of hot water (80° C.), and a solution of the silicone resin A containign 2.5 g of resin in 25 ml of dioxane is added over 10 minutes. The mixture is then filtered, washed with 2 l of water and dried at 60° C. The pigment is then condensed under the same conditions as in the Comparison Examples. A tap density of 0.98 g/cm³ is obtained. A magnetic tape is produced as described above. The properties are summarized in the Table.

EXAMPLE 1.2

The procedure is the same as in Example 1, but using 5.0 g of the silicone resin A in 50 ml of dioxane.

EXAMPLE 2.1

The procedure is the same as in Example 1, but using 2.5 g of the silicone resin B in 25 ml of dioxane.

TABLE

| | ρst g/cm³ | $I^{H}c$ powder Oe | $I^{H}c$ tape Oe | VF % | $A_{10}$ dB | $A_v$ dB |
|---|---|---|---|---|---|---|
| Comparison Example I | 0.76 | 338 | 318 | 29 | ±0 | −1 |
| Comparison Example II | 0.94 | 316 | 307 | 32.5 | −0.5 | +0.5 |
| Comparison Example III | 0.86 | 319 | 314 | 33.5 | −1 | +0.5 |
| Example 1.1 | 0.98 | 308 | 304 | 35.3 | +1 | +1 |
| Example 1.2 | 0.91 | 318 | 301 | 34.6 | +1 | +1 |
| Example 2.1 | 0.89 | 340 | 341 | 34 | +1.5 | +1 |

EXAMPLE 3

A commercial red iron oxide pigment (180 M of BAYER AG) prepared by annealing and "Micronized" to improve its dispersibility was treated with 0.5%, by weight, of substance I as described in Example 1.1. In the dispersion test, the untreated sample reached 61% of its possible ultimate color intensity after 4 hours while the pigment powder which had been treated according to the present invention already had 74% of its color intensity after 4 hours.

The dispersibility of pigments which have been after-treated according to the present invention may readily be determined by the method of DIN 53 238, drafted March 1974. As a modification of this method, a toothed disc stirrer (dissolver) rotating at 1500 revs/min is used for triturating the lacquer. FIG. 1 of the accompanying drawings shows the substantial improvement in dispersibility obtained in Example 1.1 compared with Comparison Example I.

The use of the magnetic pigments according to the present invention in magnetic record supports has been exemplified, but the pigments may also advantageously be used in magnetic inks and magnetic printing inks.

It will be appreciated that the instant specification and examples ae set forth by way of illustration and not limitation, and that various modifications and changes may be made without departing from the spirit and scope of the present invention.

We claim:

1. A finely divided annealed solid coated with about 0.1 to 2% by weight of an organo-silicone polymer of the formula

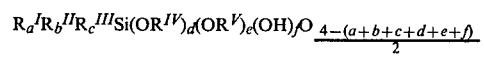

wherein
$R^I$, $R^{II}$, $R^{III}$ each independently is an optionally halogenated alkyl, alkenyl or alkyl radical having from 1 to 10 carbon atoms;
$R^{IV}$ is an alkyl or alkenyl radical having from 9 to 24 carbon atoms;
$R^V$ is an alkyl or alkenyl radical having from 1 to 8 carbon atoms;
the sum of a+b+c is from 1 to about 1.95;
d is a number from about 0.2 to 2;
e and f each independently is a number from 0 to 1;
the sum of d+e+f is from about 0.2 to 2; and
the sum of a+b+c+d+e+f is no more than 3.

2. A finely divided solid according to claim 1, wherein the polymer is of the formula

wherein
$R^I$ is methyl;
$R^{II}$ is phenyl;
$R^V$ is methyl, ethyl or vinyl;
the sum of a+b is from 1 to about 1.95;
d is a number from about 0.5 to 1.5;
e is a number from about 0.01 to 1.5; and
the sum of d+e is from about 0.51 to 2.

3. A finely divided solid according to claim 1, wherein the polymer is of the formula

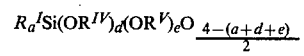

wherein
$R^I$ is methyl;
$R^V$ is methyl, ethyl or vinyl;
d is a number from about 0.2 to 0.9;
e is a number from about 0.1 to 0.8; and
the sum of d+e is from about 0.3 to 1.7.

4. A finely divided solid according to claim 1, having a specific surface area of at least about 1 m$^2$/g.

5. A finely divided solid according to claim 1, consisting essentially of α-Fe$_2$O$_3$, Fe$_3$O$_4$ or mixed phases of Fe$_2$O$_3$ and Fe$_3$O$_4$, any of which has optionally been modified with foreign ions, or of ferromegnetic metals or alloys.

6. A process for the preparation of a finely divided solid according to claim 1, comprising treating a predominantly aqueous slurry of a pigment with the organo-silicone polymer.

7. A coating, coloring or paint pigmented with a finely divided solid according to claim 1.

8. A magnetic record support, printing ink or magnetic ink containing a finely divided solid according to claim 1.

* * * * *